United States Patent Office 2,902,484
Patented Sept. 1, 1959

2,902,484

PHENTHIAZINE DERIVATIVES AND PROCESSES FOR THEIR PREPARATION

Raymond Jacques Horclois, Malakoff, France, assignor to Societe des Usines Chimiques Rhone-Poulenc, Paris, France, a French body corporate No Drawing. Application February 2, 1955
Serial No. 485,799

Claims priority, application Great Britain April 27, 1954

10 Claims. (Cl. 260—243)

This invention relates to new phenthiazine derivatives of value as therapeutic agents and as intermediates for the production of such agents. It also concerns processes for the preparation of said derivatives.

The new compounds of the present invention are those containing the structure:

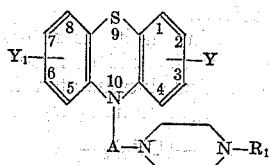

and include not only the bases conforming to this formula but also the corresponding acid addition and quaternary ammonium salts and addition compounds (such for example as those formed between the bases and 8-chlorotheophylline). In the foregoing formula, A represents a divalent saturated aliphatic hydrocarbon radical with a straight or branched chain containing from 2 to 6 carbon atoms, $R_1$ represents a hydrogen atom or a lower alkyl or an aryl or araliphatic group, Y and $Y_1$ are respectively a hydrogen or halogen atom or a lower alkyl, alkoxy or aryl or aryloxy group, preferably (in the case of Y) in the 1- or 3-position, the phenthiazine ring may contain substituents additional to Y and $Y_1$ and one or more of the carbon atoms of the piperazine ring may carry a substituent in the form of a methyl group. It should be understood that the term "lower alkyl" when used in this specification and in the appended claims means an alkyl group containing not more than 6 and preferably not more than 4 carbon atoms.

These new compounds may be prepared in a variety of different ways, of which the more important can be expressed generically as comprising the interaction of a phenthiazine compound having a structure represented by the formula:

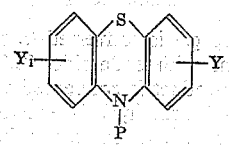

with a compound Q, the group P and the compound Q being such that Q will react with the compound of the said formula to introduce or form at the 10-position of the ring a substituent grouping of the structure:

In the formulae II and III, $A_1$ either represents the radical A (Formula I) i.e. a divalent saturated aliphatic straight or branched chain hydrocarbon radical containing 2 to 6 carbon atoms or represents a divalent grouping convertible into the radical A by reduction, Y and $Y_1$ each represent a hydrogen or halogen atom or a lower alkyl, alkoxy, aryl or aryloxy group, and $R_2$ either represents the radical $R_1$ (Formula I) i.e. a hydrogen atom or a lower alkyl, aryl or araliphatic group or represents a group convertible into the radical $R_1$. One or more of the carbon atoms of the piperazine ring may carry a substituent in the form of a methyl group and the phenthiazine ring may contain substituents additional to Y and/or $Y_1$. Where either or both of the said starting materials contain one or more "convertible" groups as hereinbefore specified, the process includes the step or steps of transforming the convertible group or groups into the desired final atom and/or group.

Specific embodiments of the generic process defined in the last preceding paragraph are as follows:

(1) interaction of a phenthiazine of the general formula:

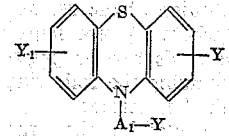

with a piperazine derivative of the general formula:

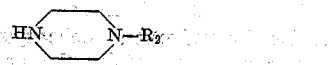

X representing the residue of a reactive ester (e.g. a halogen atom or a sulphuric or sulphonic ester radical such as a p-toluene sulphonate radical) and the other variables being as hereinbefore defined;

(2) interaction of a phenthiazine of the general formula:

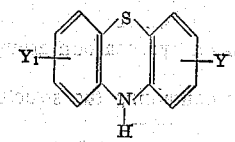

with a piperazine derivative of the general formula:

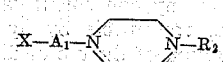

wherein the stated variables are as hereinbefore defined;

(3) in the case of the production of compounds in which the piperazine ring contains no substituent on a carbon atom, interaction of a compound of the general formula:

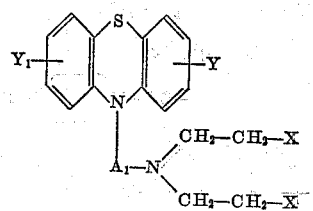

with an amine of the formula $R_2NH_2$, where the stated variables are as hereinbefore defined.

The aforesaid processes may be carried out by heating the reactants in the presence or absence of an organic diluent and, if desired, in the presence of an alkaline condensing agent, e.g. an alkali metal or derivative thereof such as the hydroxides, hydrides, amides or alcoholates, and more particularly sodium hydroxide or sodamide.

By way of illustration of the use of groups convertible into a group $R_1$ (where $R_1$ is other than a hydrogen atom) the following types of intermediates can be prepared by the aforesaid processes and converted as hereinafter stated:

(a)

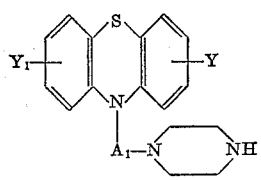   IX convertible by alkylation into corresponding compounds in which $R_1$ represents an alkyl group and:

(b)

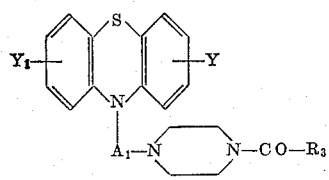   X (where $R_3$ is an alkyl, aralkyl or aryl group) convertible by reduction into corresponding compounds containing as the group R an alkyl or aralkyl group.

By way of illustration of the use of groups convertible into a radical $R_1$ where $R_1$ represents a hydrogen atom, intermediate compounds can be prepared by the aforesaid processes containing the following groups and then converted as hereinafter stated:

(a) compounds containing the structure:

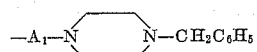   XI convertible by reduction (debenzylation), (b) compounds containing the structure:

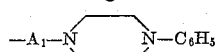   XII convertible by nitrosation and fission, (c) compounds containing the structure:

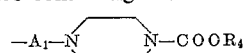   XIII where $R_4$ represents a hydrocarbon group, convertible by hydrolysis, (d) compounds containing the structure:

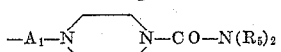   XIV where $R_5$ represents any convenient radical such as a hydrocarbon group, convertible by hydrolysis.

By way of illustration of the use of divalent groupings convertible into the grouping A, with or without groups convertible into an $R_1$ substituent, there may be prepared amide intermediates of the following types:

(a)

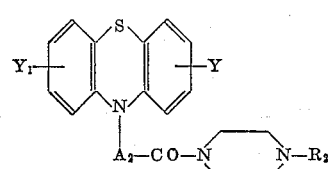   XV (b)

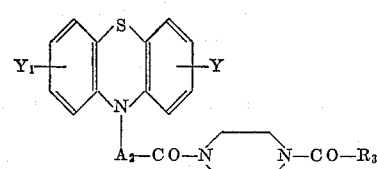   XVI the group $A_2$ being an aliphatic hydrocarbon radical containing from 1 to 5 carbon atoms and the other variables being as hereinbefore defined, conversion being effected by known methods of reduction, e.g. by the use of lithium aluminium hydride.

An alternative process for the preparation of the compounds of general Formula I comprises the cyclisation of the appropriate diphenyl sulphide of the general formula:

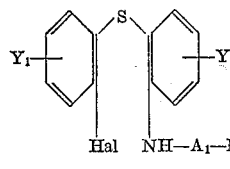   XVII wherein Hal represents a halogen atom and the remaining symbols are as hereinbefore defined. This cyclisation is preferably carried out in a solvent of the class of substituted lower aliphatic acid amides in the presence of an alkaline condensing agent such as an alkali metal hydroxide or carbonate and, if desired, also in the presence of a dehydrohalogenation catalyst such as copper powder. When either or both of $A_1$ and $R_2$ represents a "convertible" group, the process includes the subsequent step or steps of conversion to A and/or $R_1$ respectively.

The new compounds of the present invention containing a structure conforming to Formula I possess interesting pharmacodynamic properties; inparticular, they have been found to be very active anti-epileptics and anti-emetics. In consequence they have application in human or veterinary medicine.

Especially outstanding utility as anti-emetic agents is possessed by those of the said compounds in which Y represents a hydrogen or chlorine atom in the 3-position, $Y_1$ represents a hydrogen atom, A represents $$-(CH_2)_3-$$

$R_1$ represents a hydrogen atom or a methyl or ethyl group, and the piperazine ring is either unsubstituted or is substituted by a methyl group.

The invention is illustrated by the following examples.

*Example I*

10-(2-chloroethyl)phenthiazine (78.5 g.), anhydrous piperazine (76 g.) and methanol (75 cc.) are heated for four hours under reflux. The mixture is then treated then treated with distilled water (100 cc.) and chloroform (2 x 100 cc.). The decanted chloroform is washed with water (2 x 50 cc.) and is shaken with 2 N hydrochloric acid (150 cc.). A precipitate (10.5 g.) is formed which is filtered off and recrystallised from butanol (1 g. per 60 cc.) to give 1:4-di(10-phenthiazinylethyl)piperazine dihydrochloride, which melts at 220° C. (inst.).

The aqueous hydrochloric acid solution is treated with aqueous sodium hydroxide ($d$=1.33; 100 cc.) and chloroform (4 x 50 cc.). The chloroform is then dried and concentrated in vacuo to give 10-(2-1'-piperazinylethyl)-phenthiazine (74 g.). This base when treated with alcohol and ethereal hydrogen chloride gives the dihydrochloride which, when recrystallised from 90% ethanol (1 g. per 25 cc.), melts at 260° C. (inst.).

*Example II*

Phenthiazine (10 g.) is converted to the sodium derivative by treatment with sodamide (2.25 g.) in xylene (75 cc.) and the product is condensed with a solution in xylene of 1-(2-chloroethyl)-4-benzyloxycarbonylpiperazine obtained from the corresponding hydrochloride (16 g.).

By treatment of the solution with water (100 cc.), extraction with 2 N hydrochloric acid (2 x 50 cc.), treatment with aqueous sodium hydroxide, extraction with chloroform and preparation of the hydrochloride, there is obtained directly the same dihydrochloride of 10-(2-1'-piperazinylethyl)phenthiazine as described in Example I.

1-(2-chloroethyl)-4 - benzyloxycarbonylpiperazine hydrochloride, M.P. 130–132° C. (inst.), is obtained by the action of thionyl chloride upon 1-(2-hydroxyethyl)-4-benzyloxycarbonylpiperazine hydrochloride in benzene. 1-(2-hydroxyethyl)-4-benzyloxycarbonylpiperazine, B.P.

286–288° C./1 mm. Hg, is obtained by condensing ethylene oxide with 1-benzyloxycarbonylpiperazine is methanol.

Example III 10-(2-chloroethyl)phenthiazine (10.5 g.) is heated for 4 to 5 hours at 180° C. with 1-ethylpiperazine (22.8 g.). After cooling, water (25 cc.) is added and the mixture is extracted with ether (2 x 25 cc.). The ethereal solution is shaken with a normal solution of hydrochloric acid (60 cc.), the acidic layer is decanted and treated with concentrated sodium hydroxide solution (15 cc.). The base is extracted with ether (2 x 20 cc.) and the extract dried over sodium sulphate. Concentration in vacuo yields 10-(2-4'-ethyl-1'-piperazinylethyl)phenthiazine (11.4 g.) M.P. (inst.) 72° C. The picrate of this base melts at 260° C. (inst.).

10-(2-4'-ethyl-1'-piperazinylethyl)phenthiazine (2 g.) is heated for two hours under reflux with methyl iodide (10 cc.). The excess methyl iodide is distilled off and the residual resin is dissolved in water (10 cc.). The solution is treated with charcoal, filtered and evaporated in vacuo at 20° C. The residue is recrystallised from 90% ethanol (50 cc.) to give 10-(2-4'-ethyl-1'-piperazynylethyl)phenthiazine dimethiodide (2.8 g.) which melts at 240° C. (inst.).

Example IV

Proceeding as in Example III but commencing with 10-(2-chloroethyl)phenthiazine (5.25 g.) and 1-methylpiperazine (10 g.), 10-(2-4'-methyl-1'-piperazinylethyl)-phenthiazine (5.6 g.) is obtained in the form of a viscous resin. The picrate of this base melts at 265° C. (inst.).

Example V

Commencing with 10-(2-chloroethyl)phenthiazine (5.25 g.) and 1-benzylpiperazine (15.5 g.) there is obtained 10-(2-4'-benzyl-1'-piperazinylethyl)phenthiazine (8 g.), which is then treated with ethanol and ethereal hydrogen chloride to give the dihydrochloride which, on recrystallisation from water (1 g. per 7 cc.), melts at 230° C. (inst.).

Example VI

Commencing with 10-(2-chloroethyl)phenthiazine (5.25 g.) and 1-phenylpiperazine (16.2 g.) a monohydrochloride (6.5 g.) is obtained which is then recrystallised from a mixture of dimethylformamide and water (1 g. per 20 cc. of dimethylformamide and 10 cc. of water). The 10-(4'-phenyl-1'-piperazinylethyl)phenthiazine monohydrochloride thus obtained melts at 245° C. (inst.).

Example VII

Proceeding as in Example III but commencing with 10-(2-chloroethyl)phenthiazine (5.25 g.) and 1:2:3:5:6-pentamethylpiperazine (15.6 g.), there is obtained 10-(2-1':2':3':5':6'-pentamethyl-4'-piperazinylethyl)-phenthiazine (5.2 g.) as a viscous resin. The picrate of this base melts at 228° C. (inst.)

Example VIII

Proceeding as in Example III but commencing with 10-(3-chloropropyl)phenthiazine (11 g.) and 1-ethylpiperazine (22.8 g.), 10-(3-4'-ethyl-1'-piperazinylpropyl)-phenthiazine is obtained, M.P. (inst.) 52° C. The picrate of this base melts at 258° C. (inst.).

Example IX

Proceeding as in Example III but commencing with 10-(3-chloropropyl)phenthiazine (5.5 g.) and 1-ethyl-2:3:5:6-tetramethylpiperazine (5.1 g.), there is obtained 10-(3-1'-ethyl-2':3':5':6'-tetramethyl-4'-piperazinylpropyl)phenthiazine (3 g.) as a viscous resin. The picrate of this base melts at 158° C. (inst.).

Example X

Proceeding as in Example I but commencing with 10-(2-chloropropyl)phenthiazine (11 g.) and 1-ethylpiperazine (21 g.), 10-(2-4'-ethyl-1'-piperazinylpropyl)-phenthiazine (7.5 g.) is obtained, M.P. (inst.) 68° C. The picrate of this base melts at 250° C. (inst.).

Example XI 10-(2-chloropropyl)phenthiazine (5.5 g.) is heated for 5 hours at 200° C. with 1-phenylpiperazine (16.2 g.). The mixture is treated with water (50 cc.) and with ether (50 cc. followed by 20 cc.). The ethereal solutions are agitated with 7% hydrochloric acid (50 cc.) and a feebly soluble hydrochloride (4.5 g.) is obtained which is recrystallised from a 70% aqueous solution of dimethylformamide (50 cc.). 10-(2-4'-phenyl-1'-piperazinylpropyl)phenthiazine monohydrochloride (3.5 g.) is obtained, M.P. 245° C. (inst.).

Example XII 3-chlorophenthiazine (9.3 g.) is converted to the sodium derivative with sodamide (2 g.) in xylene (75 cc.). The product is condensed with 1-(2-chloroethyl)-4-methylpiperazine (8 g.) in solution (45 cc.) in xylene by boiling for five hours. 3-chloro-10-(2-4'-methyl-1'-piperazinylethyl)phenthiazine dihydrochloride (14.5 g.) is then obtained by the usual treatment, and may be recrystallized from absolute ethanol (1 g. per 10 cc.). The dihydrochloride melts at 253–255° C. (inst.).

1-(2-chloroethyl)-4-methylpiperazine dihydrochloride, M.P. 265° C. (inst.), is obtained by the action of thionyl chloride upon 1-(2-hydroxyethyl)-4-methylpiperazine in chloroform.

Example XIII 3-chloro-10-(3-chloropropyl)phenthiazine (27 g.) is heated for 5 hours under reflux on the water-bath with anhydrous piperazine (22.4 g.) and methanol (25 cc.). The mixture is then treated with water (100 cc.) and chloroform (100 cc.), the chloroform solution is shaken with N hydrochloric acid (100 cc.) and the acid solution is made alkaline with sodium hydroxide ($d$=1.33, 50 cc.). On extraction with chloroform (2 x 50 cc.), the base (15.2 g.) is obtained and is treated with maleic acid (10 g.) and ethyl acetate (200 cc.). The maleate is recrystallised from ethanol (750 cc.) and 3-chloro-10-(3-1'-piperazinylpropyl)phenthiazine di-acid maleate (18 g.) is obtained, M.P. 186° C. (inst.).

Example XIV 3-(3-chloro-10-phenthiazinyl)propyl p-toluenesulphonate (20 g.) is heated under reflux for 5 hours with anhydrous piperazine (11.6 g.) and methanol (35 cc.). The mixture is treated with water (35 cc.) and chloroform (70 cc.) and the chloroform solution is agitated with 10% hydrochloric acid (50 cc.). The acid solution is made alkaline with sodium hydroxide ($d$=1.33, 50 cc.) and the base is extracted with chloroform (50 cc.). The base (6.5 g.) is treated with maleic acid (5 g.) and ethyl acetate (100 cc.). 3-chloro-10-(3-1'-piperazinylpropyl)phenthiazine dimaleate (8 g.) is obtained which, on recrystallisation from ethanol, melts at 186° C.

3-(3-chloro-10-phenthiazinyl)propyl p-toluenesulphonate (20 g.) is prepared by treating 3-(3-chloro-10-phenthiazinyl)propanol (14.6 g.) in anhydrous pyridine (73 g.) with p-toluenesulphonylchloride (10.5 g.) added over 1 hour at a temperature in the neighbourhood of 5° C. The mixture is left at 0° C. for 48 hours and is then washed in the presence of ether with iced water, dilute hydrochloric acid and a 5% aqueous solution of sodium bicarbonate. It is then concentrated at 20° C.

Example XV

Proceeding as in Example III but commencing with 3-chloro-10-(3-chloropropyl)phenthiazine (19 g.) and 1-methylpiperazine (15 g.), there is obtained 3-chloro-10-(3-4′-methyl-1′-piperazinylpropyl)phenthiazine (15.8 g.), the dihydrochloride of which melts at 195° C. (inst.). The picrate of the base melts at 250° C. (inst.).

3-chloro-10-(3-4′-methyl-1′-piperazinylpropyl)phenthiazine (2 g.) is heated for 1 hour under reflux with methyl iodide (10 cc.). The mixture is concentrated, dissolved in water, filtered and dried in vacuo and on recrystallisation from methanol 3-chloro-10-(3-4′-methyl-1′-piperazinylpropyl)phenthiazine dimethiodide (2 g.), M.P. 266° C. (inst.), is obtained.

3-chloro-10-(3-4′-methyl-1′-piperazinylpropyl)phenthiazine (1.6 g.), 8-chlorotheophylline (0.8 g.) and methanol (2.5 cc.) are heated for one hour under reflux. Methanol (5 cc.) and water (1 cc.) are then added and the mixture is boiled for half an hour and then filtered hot to remove insoluble matter.

The alcoholic solution crystallises on cooling and the crystals are filtered off, washed with ethanol and dried in vacuo to give 3-chloro-10-(3-4′-methyl-1′-piperazinylpropyl)phenthiazine 8-chlorotheophyllinate which melts at 175° C. (inst.).

Example XVI

By treating 3-(3-chloro-10-phenthiazinyl)propyl p-toluenesulphonate (20 g.) with 1-methylpiperazine (13.5 g.) in a manner similar to that described in Example XIV, 3-chloro-10-(3-4′-methyl-1′-piperazinylpropyl)phenthiazine dimaleate (16 g.) M.P. 228° C. is obtained.

Proceeding as in Example XV but using ethyl iodide instead of methyl iodide, 3-chloro-10-(3-4′-methyl-1′-piperazinylpropyl)phenthiazine diethiodide is obtained, M.P. 268° C. (inst.).

Example XVII

Proceeding as in Example III but commencing with 3-chloro-10-(3-chloropropyl)phenthiazine (11.7 g) and 1-ethylpiperazine (20 g.), 3-chloro-10-(3-4′-ethyl-1′-piperazinylpropyl)phenthiazine (10.6 g.) is obtained in the form of a viscous resin. The picrate of this base melts at 265° C. (inst.).

The base when treated with ethanol and ethereal hydrogen chloride gives the dihydrochloride which is recrystallised from absolute ethanol (1 g. per 25 cc.). The dihydrochloride melts at 220° C. (inst.).

3-chloro-10-(3-4′-ethyl-1′-piperazinylpropyl)phenthiazine (1.2 g.) is heated with ethyl iodide (10 cc.) for two hours under reflux. The mixture is concentrated on the water-bath and the resin obtained is dissolved in water (10 cc.). On cooling, a crystalline product (1.5 g.) is obtained, which is then recrystallised from 80% ethanol (25 cc.) to give 3-chloro-10-(3-4′-ethyl-1′-piperazinylpropyl)phenthiazine diethiodide (0.8 g.), M.P. 260° C. (inst.).

By treating 3-chloro-10-(3-4′-ethyl-1′-piperazinylpropyl)phenthiazine (3.4 g.) with theophylline acetic acid (4 g.) and ethanol (15 cc.), 3-chloro-10-(3-4′-ethyl-1′-piperazinylpropyl)phenthiazine di-theophylline acetate (7.4 g.) is obtained which is water-soluble and melts at 100° C. (inst.) (not sharp).

3-chloro-10-(3-4′-ethyl-1′-piperazinylpropyl)phenthiazine (2 g.) is heated for 2 hours under reflux with 8-chlorotheophylline (1.6 g.) in methylethylketone (9 cc.) and water (1 cc.). The solution is concentrated and then treated with ethanol (10 cc.). The solution crystallises slowly and 3-chloro-10-(3-4′-ethyl-1′-piperazinylpropyl)phenthiazine di-8-chlorotheophyllinate (2.3 g.) is obtained, M.P. 185° C. (inst.).

3-chloro-10-(3-4′-ethyl-1′-piperazinylpropyl)phenthiazine (2 g.) is heated for 1½ hours under reflux with methyl iodide (3 g.) and acetone (10 cc.). The mixture is concentrated, dissolved in water, filtered and dried in vacuo at 20° C. and the product is recrystallised from methanol (10 cc.). 3-chloro-10-(3-4′-ethyl-1′-piperazinylpropyl)phenthiazine dimethiodide (0.6 g.) is obtained, M.P. 260–265° C. (inst.).

Example XVIII

Proceeding as in Example III but commencing with 3-chloro-10-(2-chloropropyl)phenthiazine (12.4 g.) and 1-(ethylpiperazine (22.8 g.), 3-chloro-10-(2-4′-ethyl-1′-piperazinylpropyl)phenthiazine (8.3 g.) is obtained in the form of a viscous resin. The picrate of this base melts at 254° C. (inst.).

Example XIX

Proceeding as in Example XI but commencing with 3-chloro-10-(2-chloropropyl)phenthiazine (6.2 g.), 3-chloro-10-(2-4′-phenyl-1′-piperazinylpropyl)phenthiazine monohydrochloride (3.4 g.) is obtained, M.P. 225° C.

Example XX

A mixture of phenthiazine (6.65 g.), 85% sodamide (2 g.) and xylene (40 cc.) is heated for 1 hour under reflux. With continued reflux, 1-(2-phenylallyl)-4-(3-chloropropyl)piperazine (11 g.) is added and heating is continued for 4 hours. The mixture is treated with water (80 cc) and the xylene is decanted. The xylene layer is treated with N hydrochloric acid (90 cc.) and 10-[3-4′-(2-phenylallyl)-1′-piperazinylpropyl]phenthiazine hydrochloride precipitates as an oil. It is converted to the base by adding sodium hydroxide ($d=1.33$, 10 cc.) and ethanol (25 cc.) and the base is extracted with ether (2 x 80 cc.). The ethereal extract is dried over sodium sulphate and the ether is removed on the water-bath. 10-[3-4′-(2-phenylallyl)-1′-piperazinylpropyl]phenthiazine (14 g.) is thus obtained and is purified by conversion to the oxalate acetone. The hydrochloride of the pure base melts at 200–202° C.

The 1-(2-phenylallyl)-4-(3-chloropropyl)piperazine which serves as starting material is prepared by the action of 1-chloro-3-bromopropane upon 1-2′-phenylallylpiperazine in ether.

Example XXI

A mixture of phenthiazine (7.6 g.), 85% sodamide (4.5 g.) and anhydrous xylene (150 cc.) is heated for 2 hours under reflux. The mixture is cooled to 30° C., 1-(4-bromobutyl)-4-ethylpiperazine monohydrobromide (15 g.) is added, the mixture is reheated gradually until reflux commences and refluxing is continued for 8 hours. The excess sodamide is decomposed, after cooling, with water (20 cc.) and the xylene layer is extracted with N hydrochloric acid (2 x 50 cc.). The hydrochloric acid extracts are made alkaline with caustic soda ($d=1.33$, 15 cc.) and the oily base which separates is extracted with ether (3 x 100 cc.). After drying over sodium sulphate, the ether is removed under normal pressure and the residue is distilled in vacuo. 10-(4-4′-ethyl-1′-piperazinylbutyl)phenthiazine (5.5 g.), B.P. 210–215° C./0.4 mm. Hg, is thus obtained. Its dihydrochloride melts at 218–220° C.

The 1-(4-bromobutyl)-4-ethylpiperazine monohydrobromide which serves as starting material in the preceding preparation is obtained by the bromination with thionyl bromide in chloroform of 1-(4-hydroxybutyl)-4-ethylpiperazine, B.P. 110–115° C./10.3 mm. Hg, itself prepared by heating 1 mole of 4-chlorobutanol with 2 moles of ethylpiperazine by heating for 10 hours at 100° C.

Example XXII

Proceeding as in Example XII but commencing with 3-chlorophenthiazine and 1-(2-chloroethyl)-4-ethylpiperazine, there is obtained 3-chloro-10-(2-4′-ethyl-1′-piperazinylethyl)phenthiazine dihydrochloride, which melts at 228–230° C. (inst.).

3 - chloro - 10 - (2 - 4' - ethyl - 1' - piperazinylethyl)-phenthiazine (1.7 g.) and methyl iodide (10 cc.) are heated for four hours under reflux. The excess methyl iodide is distilled off and the resin so obtained is dissolved in water (20 cc.). The solution is treated with charcoal, filtered and concentrated in vacuo at 20° C., and the product is recrystallised from 80% ethanol (12 cc.) to give 3-chloro-10-(2-4'-ethyl-1'-piperazinylethyl)phenthiazine dimethiodide, which melts at 262° C. (inst.).

*Example XXIII*

3-chlorophenthiazine (7 g.) is converted to the sodium derivative with sodamide (1.4 g.) in xylene (50 cc.). 1-(2-chloroethyl)-4-butylpiperazine (7 g.) in xylene (30 cc.) is then added over 10 minutes and the mixture is heated for 2 hours under reflux. The usual treatment yields 3 - chloro - 10 - (2 - 4' - butyl - 1' - piperazinylethyl)phenthiazine dihydrochloride (11.9 g.), M.P. 208° C. (inst.).

1 - (2 - chloroethyl) - 4 - butylpiperazine dihydrochloride, M.P. 245° C. (inst.) is obtained by the action of thionyl chloride upon the hydroxy compound in chloroform.

1 - (2 - hydroxyethyl) - 4 - butylpiperazine, B.P. 98–100° C./1 mm. Hg, is obtained by heating 1-(2-hydroxyethyl)piperazine with n-butyl p-toluenesulphonate for 2 hours on a water-bath, treating the mixture with aqueous sodium hydroxide and chloroform and then distilling.

*Example XXIV*

Sodamide (8.2 g.) is added to a solution of 3-chlorophenthiazine (44 g.) in toluene (250 cc.) maintained at about 120° C. and 1-(3-chloropropyl)-4-methylpiperazine (37 g.) is then added gradually over 40 minutes. After being heated for a further 40 minutes under reflux, the mixture is cooled, treated with water (200 cc.) and acidified with hydrochloric acid ($d=1.19$, 40 cc.). The organic layer is separated and the aqueous layer is washed with ether (200 cc.), made alkaline with aqueous sodium hydroxide ($d=1.33$, 50 cc.) and extracted with ether (300 cc.). The ethereal extract is dried over sodium sulphate, the ether is evaporated and the residue is distilled yielding 3 - chloro - 10 - (3 - 4' - methyl - 1' - piperazinylpropyl)phenthiazine (57 g.), B.P. 260–275° C./2 mm. Hg, the hydrochloride of which melts at 200–210° C.

3 - chloro - 10 - (3 - 4' - methyl - 1' - piperazinylpropyl)phenthiazine (6.9 g.) is heated under reflux with theobromine acetic acid (8.75 g.) and ethanol (20 cc.). The alcohol is distilled off in vacuo and the residue is dried in vacuo in the presence of sulphuric acid. 3-chloro-10 - (3 - 4' - methyl - 1' - piperazinylpropyl)phenthiazine di-theobromine acetate (15.5 g.) is obtained which is soluble in water and melts at about 130° C. (inst.).

1 - (3 - chloropropyl) - 4 - methylpiperazine, B.P. 82–83° C./3 mm. Hg, may be prepared by the action of 1 - chloro - 3 - bromopropane on 1-methylpiperazine.

*Example XXV*

Sodamide (12.9 g.) is added to a solution of 3-chlorophenthiazine (23.4 g.) in toluene (300 cc.) maintained at 80° C. The mixture is heated in the neighbourhood of its boiling point (110° C.) and 1-(3-chloropropyl)-4-methylpiperazine dihydrochloride (27.5 g.) is added gradually (over 1 hour). After addition is completed, heating is continued for 3 hours. After cooling, the mixture is treated with water (250 cc.) and is made acid to Congo Red with hydrochloric acid ($d=1.19$, 30 cc.). The toluene layer is separated and the aqueous layer is washed with ether (250 cc.) and is then made alkaline to phenolphthalein with sodium hydroxide ($d=1.33$, 35 cc.). The base which separates is extracted with ether. The ether is evaporated and the residue is distilled. 3-chloro-10-(3-4'-methyl-1'-piperazinylpropyl)phenthiazine (27.3 g.) is thus obtained, the dihydrochloride of which melts at about 195° C.

By treating 3 - chloro - 10 - (3 - 4' - methyl - 1' - piperazinylpropyl)-phenthiazine (5 g.) with theophylline acetic acid (6.3 g.) and ethanol (20 cc.) as described in Example XXIV, 3 - chloro - 10 - (3 - 4' - methyl - 1' - piperazinylpropyl)phenthiazine di-theophylline acetate (11.2 g.) is obtained which is water-soluble and melts at 100° C. (inst.) (not sharp).

*Example XXVI*

3-chlorophenthiazine (8 g.), anhydrous xylene (35 cc.) and 95% sodamide (1.52 g.) are heated under reflux for ½ hour. A solution of 1-(3-chloropropyl)-4-butylpiperazine (9 g.) in anhydrous xylene (18 cc.) is run gradually over 15 minutes into the boiling suspension of the sodium derivative of 3-chlorophenthiazine thus obtained and heating under reflux is continued for 2½ hours.

The excess sodamide is decomposed with water (30 cc.), the aqueous layer is decanted and the xylene layer is extracted with approximately normal hydrochloric acid (2 x 50 cc.). The hydrochloric acid extracts are made alkaline with sodium hydroxide ($d=1.33$, 15 cc.) and the oily base which separates is extracted with ether (3 x 80 cc.). After drying over sodium sulphate the ether is removed under normal pressure and the residue is distilled. 3 - chloro - 10 - (3 - 4' - butyl - 1' - piperazinylpropyl)phenthiazine (9.45 g.), B.P. 237–246° C./0.6 mm. Hg, is thus obtained, the dihydrochloride of which melts at 232–234° C. (inst.).

The 1-(3-chloropropyl)-4-butylpiperazine which serves as starting material in the preceding preparation is obtained by the action of 1-chloro-3-bromopropane on 1-butylpiperazine in ether under reflux. It boils at 85–87° C./0.8 mm. Hg.

*Example XXVII*

Proceeding as in Example XII but commencing with 1-chlorophenthiazine and 1-(2-chloroethyl)-4-ethylpiperazine, there is obtained 1-chloro-10-(2-4'-ethyl-1'-piperazinylethyl)phenthiazine dihydrochloride, which melts at 238–240° C. (inst.).

*Example XXVIII*

Proceeding as in Example XXVI but commencing with 1-chlorophenthiazine and 1-(3-chloropropyl)-4-ethylpiperazine, 1 - chloro - 10 - (3 - 4' - ethyl - 1' - piperazinylpropyl)phenthiazine, B.P. 213–230° C./0.25 mm. Hg, is obtained in 55% yield. Its dihydrochloride melts at 200–202° C.

*Example XXIX*

Proceeding as in Example XXVI but commencing with 1-chlorophenthiazine, 1 - chloro - 10 - (3 - 4' - butyl - 1'-piperazinylpropyl)phenthiazine (B.P. 236–245° C./0.4 mm. Hg) is obtained in a 71% yield. Its dihydrochloride melts at 255–256° C.

*Example XXX*

Proceeding as in Example XXI but commencing with 1-chlorophenthiazine, 1 - chloro - 10 - (4 - 4' - ethyl - 1'-piperazinylbutyl)phenthiazine (B.P. 180–210° C./0.3 mm. Hg) is obtained in a 40% yield. Its dihydrochloride melts at 225–230° C.

*Example XXXI*

Proceeding as in Example XXXVII but commencing with 3-methylphenthiazine (27 g.), 3-methyl-10-(3-4'-methyl-1'-piperazinylpropyl)phenthiazine (40 g.), B.P. 230–245° C./0.9 mm. Hg, is obtained, the dihydrochloride of which melts at about 200° C.

*Example XXXII*

3-methylphenthiazine (21.3 g.) is converted to the sodium derivative with sodamide (4.5 g.) in boiling xylene (180 cc.) and the product is condensed with 1-(3-chloropropyl)-4-ethylpiperazine (22.9 g.) by heating under reflux for 3 hours. The mixture is treated with water, the xylene layer is extracted with 2 N hydrochloric acid and the aqueous layer is made alkaline and extracted with ether. The ethereal extract is dried, the ether is evaporated and the residue is distilled to yield 3-methyl-10-(3-4'-ethyl-1'-piperazinylpropyl)phenthiazine (30 g.)., B.P. 233–235° C./0.2 mm. Hg, the dihydrochloride of which melts at 242–244° C.

1-(3-chloropropyl)-4-ethylpiperazine, B.P. 83–84° C./1 mm. Hg, may be prepared by the action of 1-chloro-3-bromopropane on 1-ethylpiperazine.

*Example XXXIII*

Proceeding as in Example XXXVII but commencing with 3-methoxy-phenthiazine (23.4 g.) 3-methoxy-10-(3-4'-methyl-1'-piperazinylpropyl)-phenthiazine (28 g.), B.P. 245–255° C./1 mm. Hg, is obtained, the dihydrochloride of which melts at about 225° C.

*Example XXXIV*

Proceeding as in Example XXVI but commencing with 3-methoxy-phenthiazine (12 g.) and 1-(3-chloropropyl)-4-ethylpiperazine (11.5 g.), 3-methoxy-10-(3-4'-ethyl-1'-piperazinylpropyl)phenthiazine (12.5 g.) B.P. 238–243° C./0.7 mm. Hg, is obtained, the dihydrochloride of which melts at 229° C.

*Example XXXV*

Proceeding as in Example XXVI but commencing with 3-methoxy-phenthiazine, 3-methoxy-10-(3-4'-butyl-1'-piperazinylpropyl)phenthiazine, B.P. 230–243° C./0.35 mm. Hg, is obtained in 56% yield. Its hydrochloride melts at 252–254° C.

*Example XXXVI*

Proceeding as in Example XXXVII but commencing with 3-phenyl-phenthiazine (20 g.), xylene (200 cc.), sodamide (3.1 g.) and 1-(3-chloropropyl-4-methylpiperazine (14 g.), 3-phenyl-10-(3-4'-methyl-1'-piperazinylpropyl)-phenthiazine (25 g.), B.P. 275–285° C./0.9 mm. Hg, is obtained, the dihydrochloride of which melts at about 220° C.

*Example XXXVII*

Sodamide (0.9 g.) is added to a solution of 1-phenyl-phenthiazine (5.5 g.) in xylene (55 cc.) heated to 100° C. The mixture is then heated in the neighborhood of its boiling point (120–130° C.) and a solution of 1-(3-chloropropyl)-4-methylpiperazine (3.9 g.) in xylene (8 cc.) is added slowly. After the addition is completed, heating is continued for 1½ hours. After cooling, the mixture is treated with water (55 cc.) and then it is made acid to Congo Red with hydrochloric acid ($d=1.19$, 6 cc.). The organic layer is separated and the aqueous solution is washed with ether (50 cc.) and then made alkaline to phenolphthalein with sodium hydroxide ($d=1.33$, 6.5 cc.).

The base which separates is extracted with ether (3 x 150 cc.), the ether is evaporated and the residue is distilled in vacuo. 1-phenyl-10-(3-4'-methyl-1'-piperazinylpropyl)phenthiazine (5.2 g.), B.P. 275–285° C./1 mm. Hg, is thus obtained the dihydrochloride of which melts at about 210° C.

*Example XXXVIII*

Proceeding as in Example XXVI but commencing with 2:3-dimethylphenthiazine (22.7 g.) 85% sodamide (5 g.) xylene (210 cc.) and 1-(3-chloropropyl)-4-methylpiperazine (19.4 g.) in xylene (50 cc.), 2:3-dimethyl-10-(3-4'-methyl-1'-piperazinylpropyl)phenthiazine (24.75 g.), B.P. 215–225° C./0.2 mm. Hg, is obtained, the dihydrochloride of which melts at 238° C.

The 2:3-dimethylphenthiazine (M.P. 204° C.) which serves as starting material is prepared by the action of sulphur upon 3:4-dimethyldiphenylamine in the presence of iodine.

*Example XXXIX*

10-(2-1'-piperazinylethyl)phenthiazine (9.3 g.) is heated with agitation under reflux with n-propyl p-toluenesulphonate (9.6 g.), anhydrous sodium carbonate (2.4 g.) and absolute ethanol (15 cc.). After 6 hours heating, the alcohol is distilled off and the residue is treated with N sodium hydroxide (45 cc.) and ether (100 cc.). The ethereal layer is decanted, the aqueous layer is washed with ether (60 cc.) and the combined ethereal solutions are treated with N hydrochloric acid (50 cc.). The acid solution is shaken with sodium hydroxide ($d=1.33$, 20 cc.) and then with ether (2 x 50 cc.).

On drying and concentrating, the base (6 g.) is obtained. The hydrochloride is prepared in alcohol-ether and 10-(2-4'-propyl-1'-piperazinylethyl)phenthiazine dihydrochloride (7.7 g.) is obtained which melts at 240° C. (inst.) after crystallization from ethanol (5 parts).

*Example XL*

10-(2-1'-piperazinylethyl)phenthiazine (6.2 g.), n-butyl p-toluenesulphonate (6.9 g.), anhydrous sodium carbonate (1.6 g.) and ethanol (10 cc.) are heated for five hours under reflux. The mixture is treated with N sodium hydroxide (30 cc.) and ether (2 x 50 cc.) and the ethereal solution is extracted with N hydrochloric acid (2 x 20 cc.). The acid layer is then treated with aqueous sodium hydroxide ($d=1.33$, 10 cc.) and is extracted with ether (2 x 50 cc.). After concentration, the base is treated with alcohol and ethereal hydrogen chloride to give 10-(2-4'-butyl-1'-piperazinylethyl)phenthiazine dihydrochloride (4.5 g.), which melts at 226° C. (inst.).

*Example XLI*

3-chloro-10-(3-1' piperazinylpropyl)phenthiazine (0.4 g.) is hydrogenated for 1 hour at normal pressure and at 20° C. with 30% formaldehyde (0.3 g.) and acetic acid (10 cc.) in the presence of pre-reduced Adams' platinum catalyst (0.2 g.).

The mixture is filtered and, after washing the solid with water (4 x 10 cc.), is made alkaline with sodium hydroxide ($d=1.33$) and extracted successively with ether (3 x 25 cc.) and chloroform (3 x 25 cc.). After drying, the solvents are distilled off and, on treatment with ethereal hydrogen chloride 3-chloro-10-(3-4' methyl-1' piperazinylpropyl)phenthiazine dihydrochloride is obtained, M.P. 195–200° C. (inst.).

*Example XLII*

A solution of 10-(2-4'-propionyl-1'-piperazinylethyl) phenthiazine (1.5 g.) in tetrahydrofuran (8 cc.) is added over 15 minutes to a 2% ethereal solution of lithium aluminum hydride (10 cc.).

The mixture is heated with agitation under reflux for 6 hours and, after standing overnight, is treated successively with water (0.25 cc.), 15% sodium hydroxide (0.25 cc.), water (7 cc.) and chloroform (20 cc.). The precipitate is filtered off and washed with chloroform (5 x 5 cc.). The liquors are dried over sodium sulphate and concentrated, and on the addition of etheral hydrogen chloride give 10-(2-4'-propyl-1'-piperazinylethyl) phenthiazine dihydrochloride (1.5 g.) melting at 240° C. (inst.) as in Example XXXIX.

10-(2-4'-propionyl-1'-piperazinylethyl)phenthiazine hydrochloride, M.P. 165° C. (inst.), is obtained by the action of propionyl chloride on 10-(2-1'-piperazinylethyl) phenthiazine in the presence of pyridine.

*Example XLIII*

A solution of 3-chloro-10-(3-4'-acetyl-1'-piperazinylpropyl)phenthiazine (0.6 g.) in tetrahydrofuran (8 cc.) is added over ½ hour to a 2% ethereal solution of lithium aluminium hydride (10 cc.) and the mixture is heated for 7 hours under reflux with agitation. The usual treatment yields 3-chloro-10-(3-4'-ethyl-1'-piperazinylpropyl) phenthiazine dihydrochloride, M.P. 220–225° C. (inst.).

3-chloro-10-(3-4'-acetyl-1'-piperazinylpropyl) phenthiazine hydrochloride, M.P. 215° C. (inst.), is obtained by the action of acetyl chloride and pyridine upon 3-chloro-10-(3-1'-piperazinylpropyl) phenthiazine.

Example XLIV

3 - chloro - 10 - [3-(di-N-2-chloroethyl)aminopropyl] phenthiazine hydrochloride (1.8 g.) is heated in a sealed tube for 4 hours at 140° C. with a 290 g./1 aqueous solution (9 cc.) of monomethylamine. The contents of the tube are treated with chloroform (40 cc.). The aqueous layer is decanted and the chloroform layer is shaken with N hydrochloric acid (15 cc. followed by 2 cc.). The aqueous solution is treated with sodium hydroxide ($d=1.33$, 10 cc.) and chloroform (20 cc.). After evaporation of the solvent, the base (1.5 g.) is obtained. A solution of maleic acid (1 g.) in ethanol (5 cc.) is added and after recrystallisation from water, 3-chloro-10-(3-4'-methyl-1'-piperazinylpropyl)phenthiazine dimaleate is obtained, M.P. 228° C. (inst.).

Example XLV

10 - (2-4'-benzyl-1'-piperazinylethyl)phenthiazine dihydrochloride (0.4 g.) is hydrogenated in acetic acid (7 cc.) with palladised charcoal (0.5 g., 10% palladium) at 20° C. and at atmospheric pressure. The hydrogenation is complete after 2 hours. After filtering and washing with water made alkaline with concentrated aqueous sodium hydroxide, the base so obtained is extracted with ether (4 x 10 cc.). Treatment of the base with ethereal hydrogen chloride yields 10 - (2 - 1' - piperazinylethyl) phenthiazine dihydrochloride (0.2 g.) which, after recrystallisation from absolute ethanol, melts at 260° C. (inst.).

Example XLVI 10-(2-4'-phenyl-1'-piperazinylethyl)phenthiazine hydrochloride (1.15 g.) agitated with dimethylformamide (20 cc.) and hydrochloric acid ($d=1.19$, 2 cc.), is treated with a solution of sodium nitrite (0.2 g.) in water (2 cc.) the temperature being kept below 0° C. After 1 hour, sodium bisulphite ($d=1.33$, 3 cc.) is added, and after standing overnight, the mixture is treated with sodium hydroxide ($d=1.33$, 6 cc.) and water (20 cc.). It is then shaken with chloroform (2 x 25 cc.) and, on the addition of ethereal hydrogen chloride, 10-(2-1'-piperazinylethyl)phenthiazine dihydrochloride (0.9 g.) is obtained, M.P. 260° C. (inst.).

Example XLVII

10 - (2 - 4' - ethoxycarbonyl - 1' - piperazinylethyl) phenthiazine (1 g.) is heated for 24 hours under reflux with alcoholic potassium hydroxide (250 g. per litre; (15 cc.). The solution is concentrated and treated with water (5 cc.) and ether (4 x 10 cc.). The addition of ethereal hydrogen chloride yields 10 - (2 - 1' - piperazinylethyl) phenthiazine dihydrochloride (0.7 g.) which, after recrystallisation from ethanol, melts at 260° C. (inst.).

10 - (2-4'-ethoxycarbonyl-1'-piperazinylethyl) phenthiazine may be obtained by heating 10-(2-chloroethyl) phenthiazine (10.5 g.) with 1-ethoxycarbonylpiperazine (31.6 g.) for 4 hours at 195° C. and then treating the mixture with water (30 cc.) and ether 2 x 20 cc.). The ethereal solution is shaken with 10% hydrochloric acid (35 cc.), and treatment with sodium hydroxide and ether yields 10 - (2 - 4' - ethoxycarbonyl-1'-piperazinylethyl) phenthiazine (16.5 g.), M.P. 95° C. (inst.).

Example XLVIII

10 - (2 - 4' - diethylcarbamyl - 1' - piperazinylethyl) phenthiazine hydrochloride (0.3 g.) is heated for 30 hours under reflux with hydrochloric acid ($d=1.19$, 7 cc.). Water (20 cc.) is then added, a small quantity of insoluble matter is filtered off and the aqueous solution is treated with sodium hydroxide solution ($d=1.33$, 8 cc.). Extraction with chloroform (2 x 20 cc.), drying over sodium sulphate, concentration and treatment with ethereal hydrogen chloride yields 10 - (2 - 1' - piperazinylethyl) phenthiazine dihydrochloride (0.15 g.) which, after recrystallisation from ethanol, melts at 260° C. (inst.).

10 - (2 - 4' - diethylcarbamyl - 1' - piperazinylethyl) phenthiazine may be obtained by heating 10-(2-chloroethyl)phenthiazine (5.2 g.) with 1 - diethylcarbamyl-piperazine (18.5 g.) for 5 hours at 200° C. The usual treatment yields 10-(2-4'-diethylcarbamyl-1'-piperazinylethyl)phenthiazine hydrochloride (6 g.), M.P. 182–184° C. (inst.).

The following derivatives may also be treated in a similar manner: 10-(2-4'-dimethylcarbamyl-1'-piperazinylethyl)phenthiazine hydrochloride, M.P. 215° C. (inst.). 10 - (2 - 4' - phenylcarbamyl - 1' - piperazinylethyl) phenthiazine, M.P. 160° C. (inst.). 10-(2-4'-carbamyl-1'-piperazinylethyl) phenthiazine hydrochloride, M.P. 180° C. (inst.).

Example XLIX 3-chloro-10-(2-chloroethyl)phenthiazine (29.6 g.) is heated for 6 hours under reflux with anhydrous piperazine (26 g.) and methanol (30 cc.). The mixture is then treated with chloroform (100 cc.) and water (100 cc.) and filtered and the chloroform layer is agitated with 10% hydrochloric acid (100 cc.). The aqueous layer is treated with aqueous sodium hydroxide ($d=1.33$, 40 cc.) and the base is extracted with chloroform (2 x 50 cc.). After the chloroform has been evaporated the crude base (27.7 g.) is obtained, to which is added ethyl acetate (200 cc.) and a warm solution of maleic acid (20.8 g.) in ethyl acetate (600 cc.). A maleate is obtained which is recrystallised from ethanol (1,200 cc.) to give 3-chloro-10-(2-1'-piperazinylethyl)phenthiazine dimaleate (34.8 g.), M.P. 195° C.

Example L 3-ethylphenthiazine (5.7 g.) is heated for 1 hour under reflux with sodamide (3.6 g.) in xylene (150 cc.). 1 - methyl - 4-(3-chloropropyl)piperazine dihydrochloride (7.5 g.), is added over ¼ hour and heating under reflux is continued for 6 hours. Water (100 cc.) is then added and the xylene layer is agitated with 7% hydrochloric acid (50 cc. followed by 25 cc.). The aqueous layer is treated with aqueous sodium hydroxide ($d=1.33$, 25 cc.) and the base is extracted with ether (2 x 25 cc.). On evaporating off the ether the crude base (9 g.) is obtained which is triturated with a warm solution of maleic acid (5.8 g.) in ethyl acetate (150 cc.) to give 3-ethyl-10-(3-4'-methyl-1'-piperazinylpropyl)phenthiazine dimaleate (12 g.) M.P. 200° C. which may be recrystallised from water.

Example LI

2:5-dimethylpiperazine (6.9 g.) is heated for 7 hours under reflux with 3-chloro-10-(3-hydroxypropyl)phenthiazine p-toluenesulphonate (8.9 g.) and methanol (10 cc.). The mixture is treated with chloroform (100 cc.) and water (100 cc.) and the chloroform layer is agitated with 10% hydrochloric acid (25 cc.). The aqueous layer is filtered and aqueous sodium hydroxide ($d=1.33$, 10 cc.) is added. The base is extracted with chloroform (3 x 25 cc.) and on evaporation of the chloroform the crude base (4 g.) is obtained, which is treated with ethereal hydrogen chloride to give 3-chloro-10-(3-2':5'-dimethyl-1'-piperazinylpropyl)-phenthiazine dihydrochloride (2.7 g.), M.P. 195° C.

Example LII

A mixture of 10-(2-chloropropyl)phenthiazine (13.8 g.) and anhydrous piperazine (13 g.) is fused by heating in an oil-bath for 7 hours at 160° C. The mixture is then treated with water (40 cc.) and chloroform (60 cc.), the chloroform layer is agitated with 10% hydrochloric acid (40 cc.) and the aqueous layer is then filtered and treated with aqueous sodium hydroxide ($d=1.33$, 30 cc.). The base is extracted with chloroform (2 x 20 cc.) and on evaporation of the chloroform, the crude base (5.9 g.) is isolated and is treated with maleic acid (4.2 g.) in ethyl acetate (50 cc.) to give 10-(2-1'-piperazinylpropyl) phenthiazine dimaleate (8.1 g.), M.P. 160° C., which may be recrystallised from ethanol.

Example LIII 10-(3-chloropropyl)phenthiazine (7.5 g.) is heated for 5½ hours under reflux with anhydrous piperazine (7 g.) and methanol (10 cc.). Water (30 cc.) and chloroform (2 x 20 cc.) are then added and the chloroform layer is agitated with 9% hydrochloric acid (20 cc.). The aqueous acid layer is made alkaline with sodium hydroxide ($d=1.33$, 10 cc.) and the base is extracted with chloroform (2 x 20 cc.).

After concentration, the base (6.7 g.) is isolated and is treated with maleic acid (6 g.) and ethyl acetate (150 cc.) to give 10-(3-1'-piperazinylpropyl)phenthiazine dimaleate (7.7 g.), M.P. 185° C.

Example LIV

Phenthiazine (8 g.) is heated for one hour under reflux with sodamide (1.8 g.) and xylene (100 cc.) and a solution of 1-(3-chloropropyl)-4-methylpiperazine (8.5 g.) in xylene (20 cc.) is then added dropwise over 2 hours. The mixture is heated under reflux for 5 hours and is then treated with water (100 cc.) and with ether (100 cc.). The ether-xylene layer is agitated with 7% hydrochloric acid (60 cc. followed by 2 x 20 cc.), the aqueous acid layer is made alkaline with sodium hydroxide ($d=1.33$, 40 cc.) and the base is extracted with ether (3 x 50 cc.).

After concentration, the base (13 g.) is isolated and is treated with maleic acid (9 g.) and ethyl acetate (230 cc.). The crude maleate is recrystallised from boiling water (750 cc.) and 10-(3-4'-methyl-1'-piperazinylpropyl) phenthiazine dimaleate (15 g.) is obtained, M.P. 210° C.

It should be noted that in the foregoing specification and in the appended claims the system of numbering of substituents in the phenthiazine ring is that of Beilstein.

I claim:

1. Therapeutic phenthiazine compounds having the fundamental structural formula:

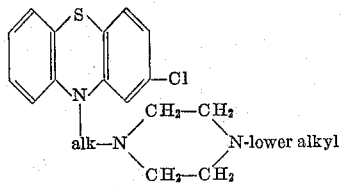

wherein alk is a lower alkylene radical separating the two nitrogen atoms linked thereto by at least two carbon atoms.

2. Therapeutic phenthiazine compounds having the fundamental structural formula:

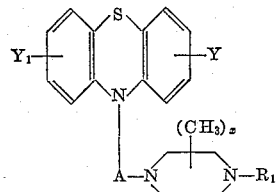

wherein A is a divalent saturated aliphatic hydrocarbon radical containing from 2 to 6 carbon atoms, at least two carbon atoms thereof separating the penthiazine nitrogen and the piperazine N' nitrogen; Y and $Y_1$ are members selected from the group consisting of hydrogen, halogen, lower alkyl, lower alkoxy and phenyl; $R_1$ is a member selected from the group consisting of hydrogen, lower alkyl, phenyl, benzyl, and 2-phenylallyl, and $x$ is an integer from 0 to 4.

3. Therapeutic phenthiazine compounds having the fundamental structural formula:

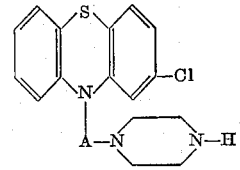

wherein A is a divalent saturated aliphatic hydrocarbon radical containing from 2 to 6 carbon atoms, at least two carbon atoms thereof separating the phenthiazine nitrogen and the piperazine N' nitrogen.

4. Therapeutic phenthiazine compounds having the fundamental structural formula:

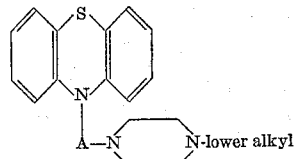

wherein A is a divalent saturated hydrocarbon radical containing from 2 to 6 carbon atoms, at least two carbon atoms thereof separating the phenthiazine nitrogen and the piperazine N' nitrogen.

5. Therapeutic phenthiazine compounds having the fundamental structural formula:

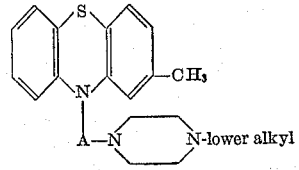

wherein A is a divalent saturated aliphatic hydrocarbon radical containing from 2 to 6 carbon atoms, at least two carbon atoms thereof separating the phenthiazine nitrogen and the piperazine N' nitrogen.

6. 3-chloro-10-(3-4'-methyl-1'-piperazinylpropyl)-phenthiazine.

7. 3-chloro-10-(3-4'-methyl-1'-piperazinylpropyl)-phenthiazine dimaleate.

8. 3-chloro-10-(3-1'-piperazinylpropyl)-phenthiazine.

9. 10-(3-4'-methyl-1'-piperazinylpropyl)-phenthiazine.

10. 3 - methyl - 10 - (3-4'-methyl-1'-piperazinylpropyl)-phenthiazine.

References Cited in the file of this patent

UNITED STATES PATENTS

| | | |
|---|---|---|
| 2,534,237 | Cusic | Dec. 19, 1950 |
| 2,590,125 | Robinson et al. | Mar. 25, 1952 |
| 2,627,517 | Cusic | Feb. 3, 1953 |
| 2,645,640 | Charpentier | July 14, 1953 |
| 2,676,971 | Cusic et al. | Apr. 27, 1954 |

FOREIGN PATENTS

| | | |
|---|---|---|
| 632,277 | Great Britain | Nov. 18, 1949 |